United States Patent [19]

Schlüter et al.

[11] Patent Number: 5,709,437
[45] Date of Patent: Jan. 20, 1998

[54] VEHICLE BRAKING SYSTEM

[75] Inventors: Peter Schlüter, Kammerforst; Stefan Borsch, Winningen, both of Germany

[73] Assignee: Lucas Industries, public limited company, Solihull, Great Britain

[21] Appl. No.: 712,902

[22] Filed: Sep. 12, 1996

Related U.S. Application Data

[63] Continuation of PCT/EP95/02007, May 26, 1995.

[30] Foreign Application Priority Data

May 26, 1994 [DE] Germany ............... 44 18 444.1

[51] Int. Cl.$^6$ ................................... B60T 13/66
[52] U.S. Cl. .............. 303/113.4; 188/1.11; 188/356; 303/114.3
[58] Field of Search ............... 303/114.3, 113.4, 303/113.3, 119.1, 114.2, 114.1, 115.1, 125, 135, 155; 92/5 R; 91/1, 369.1–369.4, 376 R; 188/356–359, 1.11 E, 1.11 R, 1.11

[56] References Cited

U.S. PATENT DOCUMENTS

| | | | |
|---|---|---|---|
| 4,653,813 | 3/1987 | Burgdorf | 188/1.11 E |
| 4,826,255 | 5/1989 | Volz | 303/113.4 |
| 4,875,740 | 10/1989 | Takayama | 303/114.3 |
| 4,978,820 | 12/1990 | Levrai et al. | |
| 5,000,525 | 3/1991 | Reinartz et al. | 303/113.4 |
| 5,072,996 | 12/1991 | Heibel et al. | 303/114.3 |
| 5,141,295 | 8/1992 | Burgdorf et al. | 303/113.4 |
| 5,176,433 | 1/1993 | Byrnes et al. | 303/113.3 |
| 5,197,788 | 3/1993 | Fennel et al. | 303/113.4 |
| 5,224,410 | 7/1993 | Graichen et al. | 91/1 |
| 5,231,913 | 8/1993 | Reinartz et al. | 92/5 R |
| 5,261,312 | 11/1993 | Bornemann et al. | 92/98 R |

FOREIGN PATENT DOCUMENTS

| | | | |
|---|---|---|---|
| 0530475 | 3/1993 | European Pat. Off. | |
| 3731603 | 5/1988 | Germany | |
| 3808523 | 9/1989 | Germany | 303/113.4 |
| 3918012 | 12/1990 | Germany | |
| 9005629 | 10/1991 | Germany | |
| 4128159 | 2/1993 | Germany | |
| 4211849 | 10/1993 | Germany | |
| 2256018 | 11/1992 | United Kingdom | |
| 8901434 | 2/1989 | WIPO | |
| 9325865 | 12/1993 | WIPO | |

Primary Examiner—Douglas C. Butler
Attorney, Agent, or Firm—Wood, Herron & Evans, L.L.P.

[57] ABSTRACT

A vehicle braking system with an electronically controllable brake servo unit which comprises a first pneumatic working chamber (13) and a second pneumatic working chamber (14) which are separated from each other by a movable wall (11), wherein a travel sensor (20) is provided for the detection of displacements of the movable wall (11) relative to a stationary wall (5b) of at least one of the two working chambers (13, 14) is improved to simplify assembly and adjustment of the travel sensor in such a manner that a wall (11) is provided with an opening (19) through which a measuring element (10) being connected with another wall (5b) is projecting, and that the travel sensor (20) converts a relative movement between the measuring element (10) and the travel sensor (20) in the direction of the movement of the movable wall (11) into a signal used for controlling the brake servo unit.

9 Claims, 4 Drawing Sheets

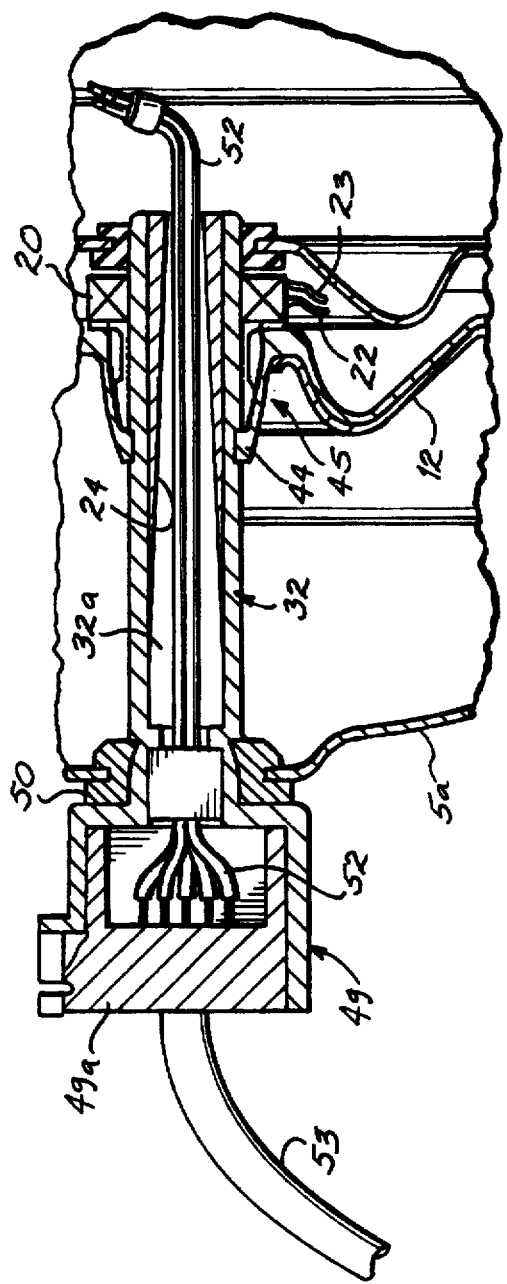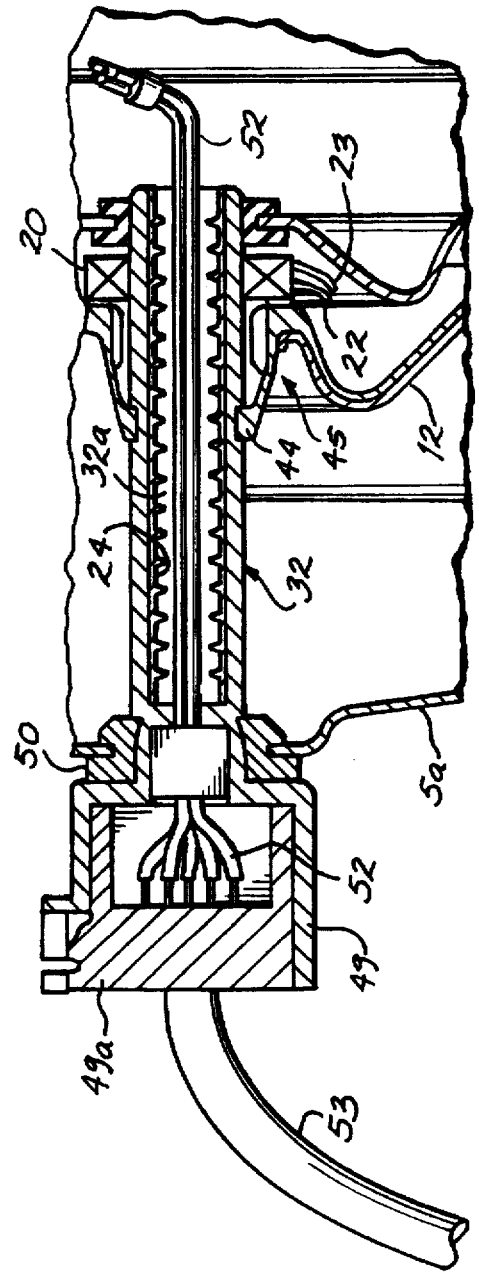
FIG. 4
FIG. 5

VEHICLE BRAKING SYSTEM

This application is a continuation of now pending PCT Application PCT/EP95/02007 filed May 26, 1995, which in turn was based on German Application No. P4418444.1 filed May 26, 1994.

DESCRIPTION

The present invention relates to a vehicle braking system with the characteristics as it is known from DE 39 18 012 A1.

The travel sensor described therein serves the purpose to determine the actuation speed of the brake-pedal of the braking system, in order to utilize it e.g. as a criterium for initiating an electrically released emergency braking.

Such a system is also known from DE 37 31 603 A1. In this system a travel switch comprising a travel sensor element, the free end of which rests against the movable diaphragm wall, is arranged at the inner surface of the casing shell of a vacuum booster.

The embodiment is disadantageous in that the assembly and particularly the adjustment of the zero position of the travel switch are relatively expensive and complicated.

From DE 42 11 849 A1 a pneumatic brake servo unit with a servo unit housing is known, wherein the front and rear wall are connected by axially parallel tie bolts, one end of which projects from the housing wall so that the brake servo unit can be secured to the vehicle.

From DE 41 28 159 A1 a measuring means for the contactless determination of the travel of a component is known, where a coil body comprises two coils which are wired in a voltage divider. The coils are wound with increasing distance of the individual windings on the coil body in such a manner that they generate an inhomogenous magnetic field in the current-carrying condition, i.e. a magnetic field which varies over the longitudinal extension of the coil body, which is detected by means of a measuring means being guided in the longitudinal direction at a radial distance relative to the coil.

From WO 93/25865 A1 a position measuring system for a cylinder/piston arrangement ist known, where an optically readable scale is applied to the piston rod, which can be detected by an appropriate sensor.

On the basis of the above discussed state of the art, the invention is based on the object to improve a vehicle braking system with an electronically controllable brake servo unit in such a manner that assembly and adjustment of the travel sensor can be accomplished more easily. An improved vehicle brake according to this invention solves these and other objects as detailed herein.

This arrangement permits assembly and adjustment of the measuring element and the travel sensor from outside the housing of the brake servo unit or the working chambers, respectively. Moreover, in the case of a defect, the affected defective part can be replaced, if necessary, without a complete disassembly of the brake servo unit housing.

Due to the fact that the travel sensor is arranged at the passage either inside or outside the housing, it is very conveniently accessible and can also easily be replaced or its position relative to the measuring element be changed and thus be adjusted, respectively. In particular, in a preferred embodiment the travel sensor is arranged in a passage through the movable partition.

Because the travel sensor at least partially surrounds the passage and the measuring element projecting through it, an optimally exact scanning of the measuring element and thus a precise measuring of the displacement of the movable wall between the two working chambers can be achieved.

The measuring element either comprises markings which can be detected by the travel sensor upon movements of the movable wall. In this case, the travel sensor is arranged at the passage. It is, however, also possible that the measuring element carries the travel sensor and that markings are provided in the passage area, which can be detected by the travel sensor upon movements of the movable wall.

According to a preferred embodiment of the invention the measuring element is formed by a tie bolt which is used for securing the brake servo unit in the vehicle. This arrangement is particularly advantageous in that it permits a reduction of parts, because the tie bolt can be utilized to serve two purposes; on the one hand mounting the brake servo unit in the vehicle and on the other hand operating as a measuring element.

According to another preferred embodiment of the invention, the measuring element is formed by a cable carrier which serves to introduce lines, preferably electrical cables, into the interior of the brake servo unit. In a similar manner, the same advantages are achieved here. One component is assigned two functions.

There is also the possibility to combine the function of the tie bolt as well as the function of introducing lines into the brake servo unit interior as well as the function of the measuring element in one component, i.e. in the tie bolt. For this purpose at least portions of the tie bolt or the cable carrier, respectively, comprise a hollow space in which lines for sensors or actuators are routed. The lines can then be routed to the appropriate places in the brake servo unit interior through corresponding radial openings along the longitudinal extension of the tie bolt.

The above-mentioned markings may be realized also in the form of resistive, Capacitive or inductive elements which are arranged in the interior of the tie bold or the cable carrier. Scanning said resistive, capacitive or inductive elements can be effected without mechanical contact from the outside of the tie bolt or the cable carrier. Depending on the measuring principle according to which the travel sensor operates, the tie bolt or the cable carrier may be a structural element which hermetically surrounds the lines for the sensors of actuators and/or the respective resistive, capacitive or inductive element depending on the measuring principle. Three is however also the possibility to integrate a longitudinal slot into the tie bolt or the cable carrier, which allows accomplishing the sealed passage of the travel sensor to the markings.

In order not to impair the vacuum in one of the working chambers or the pressure gradient between the working chambers, respectively, by the embodiment of the tie bolt or the cable carrier, respectively, according to the invention, the passage area of the tie bolt or the cable carrier, respectively, through a housing wall into the working chamber is hermetically sealed. The outlet areas of the lines from the tie bolt or the cable carrier, respectively, inside the brake servo unit housing may also be sealed. With such a design, however, an inspection for leakage is more difficult.

In order to accomplish the passage of the tie bolt or the cable carrier, respectively, through the partitions of the individual chambers or through the wall of the brake servo unit housing, respectively, hermetically sealed but axially movable, the tie bolt or the cable carrier, respectively, is surrounded in a preferred embodiment by a sealing element. This sealing element preferably has the shape of a bellows with a sealing lip which surrounds the tie bolt or the cable carrier, respectively.

If, in particular, the tie bolt or the cable carrier, respectively, is provided at the inner wall of the hollow space with the markings that can be detected by the travel sensor, the outer surface of the tie bolt or the cable carrier, respectively, can be formed absolutely smooth and thus cause little wear of the seal lip of the sealing element.

For such embodiments particularly suitable markings can be so designed that they can be detected by a capacitive, inductive, resistive, optical or magnetic field sensitive travel sensor. At the inner surface of the cable carrier, for example, magnets can be arranged, which can be detected by means of a Hall sensor serving as a travel sensor.

It is, however, also possible to integrate the markings so smoothly in the outer surface of the tie bolt or the cable carrier, respectively, that the seal lip will not be damaged when sweeping over the markings.

In a preferred embodiment of the invention the brake servo unit according to the invention is designed as a tandem brake servo unit where the tie bolt penetrates the working chambers arranged one after the other and where the two working chambers with a higher pressure level each are pneumatically connected to each other by means of a bellows surrounding the tie bolt. The travel sensor which detects markings on the tie bolt is arranged at a movable wall. The bellows thus also surrounds the travel sensor mounted at the movable wall and surrounding the tie bolt at a radial distance, and/or at the inner side of which axial slots are arranged as air passages.

Further characteristics, design options and advantages of the invention will become apparent from the detailed description of the drawing in which:

FIG. 4 shows a schematic side sectional view of the detail portion identified by X in FIG. 3; and FIG. 5 shows a schematic side sectional view of the detail portion identified by X in FIG. 3 in a second embodiment.

Figure 1:
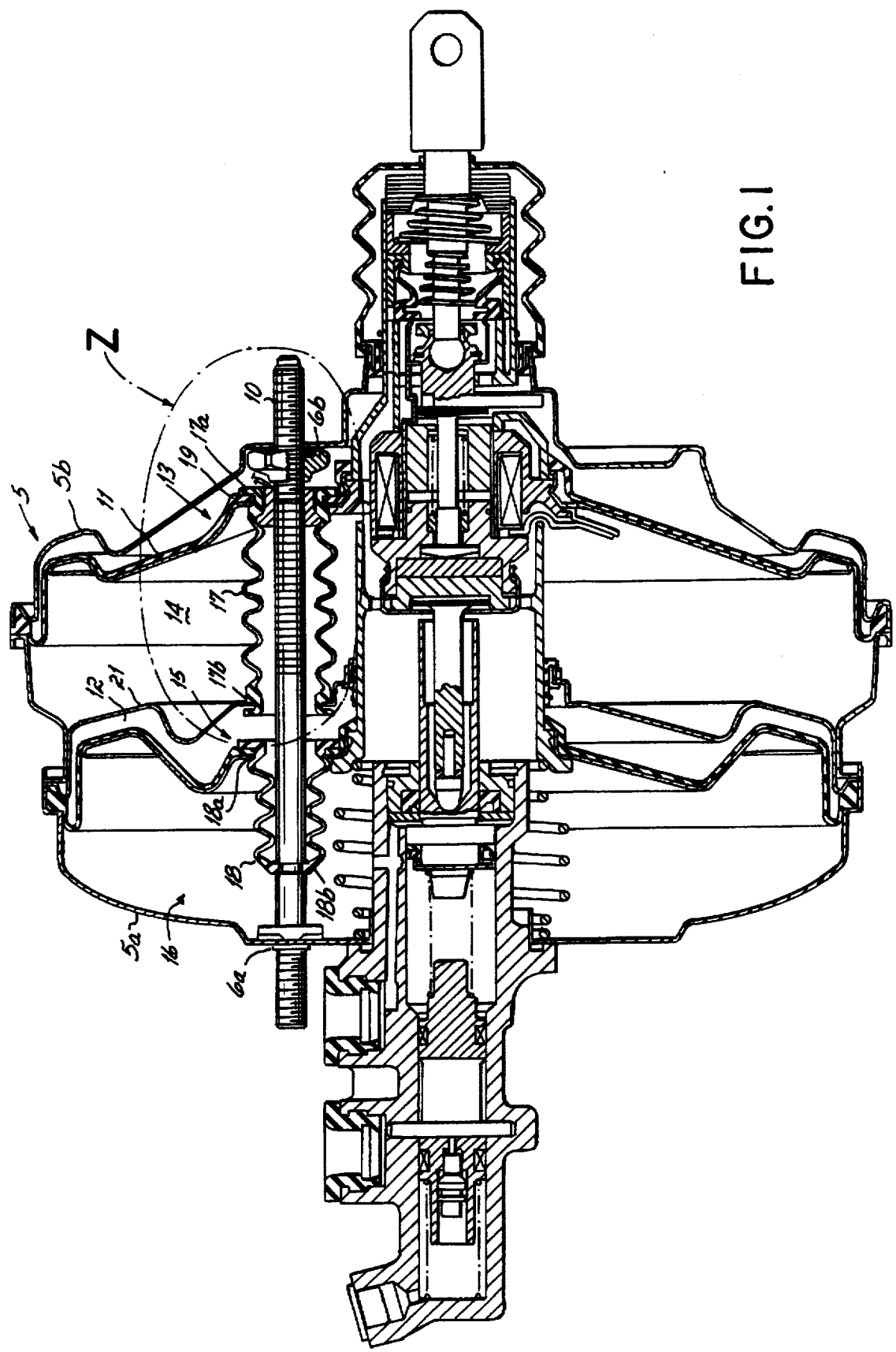
FIG. 1 shows a schematic side sectional view of a tandem brake servo unit of a vehicle braking system.

The brake servo unit shown in FIG. 1 is designed as a tandem brake servo unit. For the sake of clarity, the details of the valve arrangement and actuation as well as any other details being of no relevance in the present context will not be discussed individually in the following.

A housing 5 of the brake servo unit comprises two continuous tie bolts 10 (only one of which is shown), which axially penetrate movable partition walls 11, 12 of the associated servo unit chambers 13, 14, 15, 16. The tie bolts 10 are at least in portions (in the case of the working chamber 16) sealed against the respective servo unit chambers 14, 16 by means of bellows 17, 18 made from rubber.

The tie bolts 10 project from outer walls 5a, 5b of the housing 5 of the brake servo unit and are braced from the inner surface of these walls 5a, 5b by means of a corresponding shoulder 6a at the tie bolt 10 or a nut 6b, respectively. A hermetically tight seal between the shoulder 6a and the inner surface of the wall 5a is obtained by means of wobble pressing.

Figure 2:
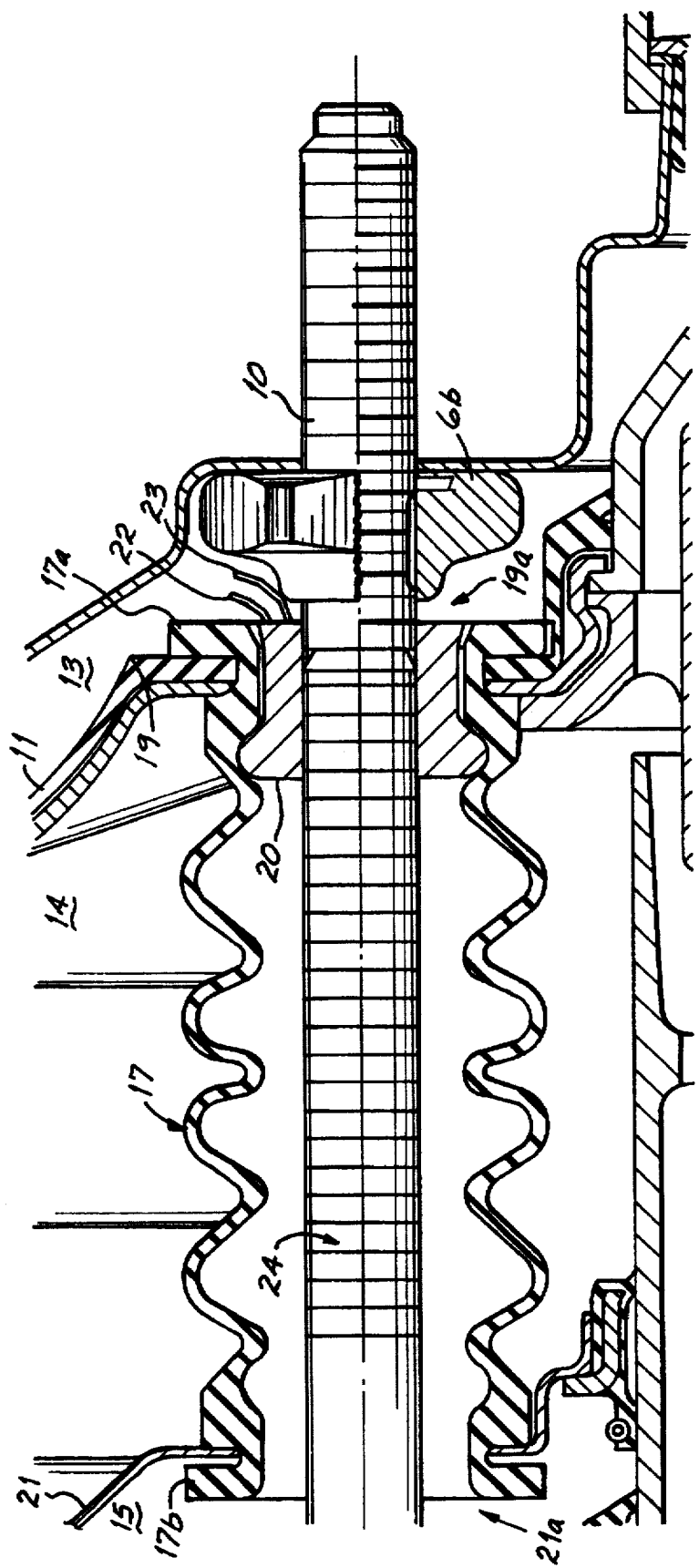
FIG. 2 shows a schematic side sectional view of the detail portion identified by Z in FIG. 1.

The bellows 17 is used to connect the two working chambers 13, 15 of the tandem brake servo unit in a simple manner. For this purpose, the movable wall 11 is provided with an opening 19a which accepts the bellows 17 with a collar shaped stop 17a (see FIG. 2). In a similar manner, the other end of the bellows 17 with a collar shaped stop 17b is accommodated in a corresponding opening 21a in an opposite wall 21. The diameters of the openings 19a, 21a at the inner surface of the bellows 17 are so dimensioned that on the one hand a travel sensor 20 can be mounted at the movable wall 11 within the bellows 17 and that on the other hand a pneumatic connection is made between the working chamber 13 and the working chamber 15. For this purpose, the sensor element 20 is provided with axial slots (not shown).

Via cables 22, 23 which are routed to an external electronic control unit the travel sensor 20 can transmit signals corresponding to the movement of the partition 11 relative to the tie bolt 10.

For this purpose the tie bolt 10 surrounded by the travel sensor 20 is provided with markings 24 indicated as rings which cause signals to be generated in the travel sensor 20 during a movement of the partition 11. The sensor system can be designed as a capacitive, inductive, optoelectrical or magnetic field sensitive travel sensor system.

In the control unit (not shown), the signals are assigned a corresponding axial actuation travel. In a computer module this axial actuation travel is differentiated with respect to time and the actuation speed determined therefrom, so that by another differentiation with respect to time the actuation acceleration can also be determined.

Using these signals the electronic control unit is capable of generating a release signal for e.g. a power assisted emergency braking upon exceeding fixed and/or variable threshold values.

In a similar manner as described for the movable wall 11 and the wall 21, the bellows 18 with a collar shaped stop 18a is mounted at the movable wall 12 in an opening of the movable wall 12. The bellows 18, however, does not surround the tie bolt 10 all the way to the wall 5a of the housing 5. The bellows 18 rather extends to approximately half of the axial extension of the working chamber 16, and its free end is provided with a seal lip 18b tightly surrounding the circumference of the tie bolt 10.

Figures 3, 3A:
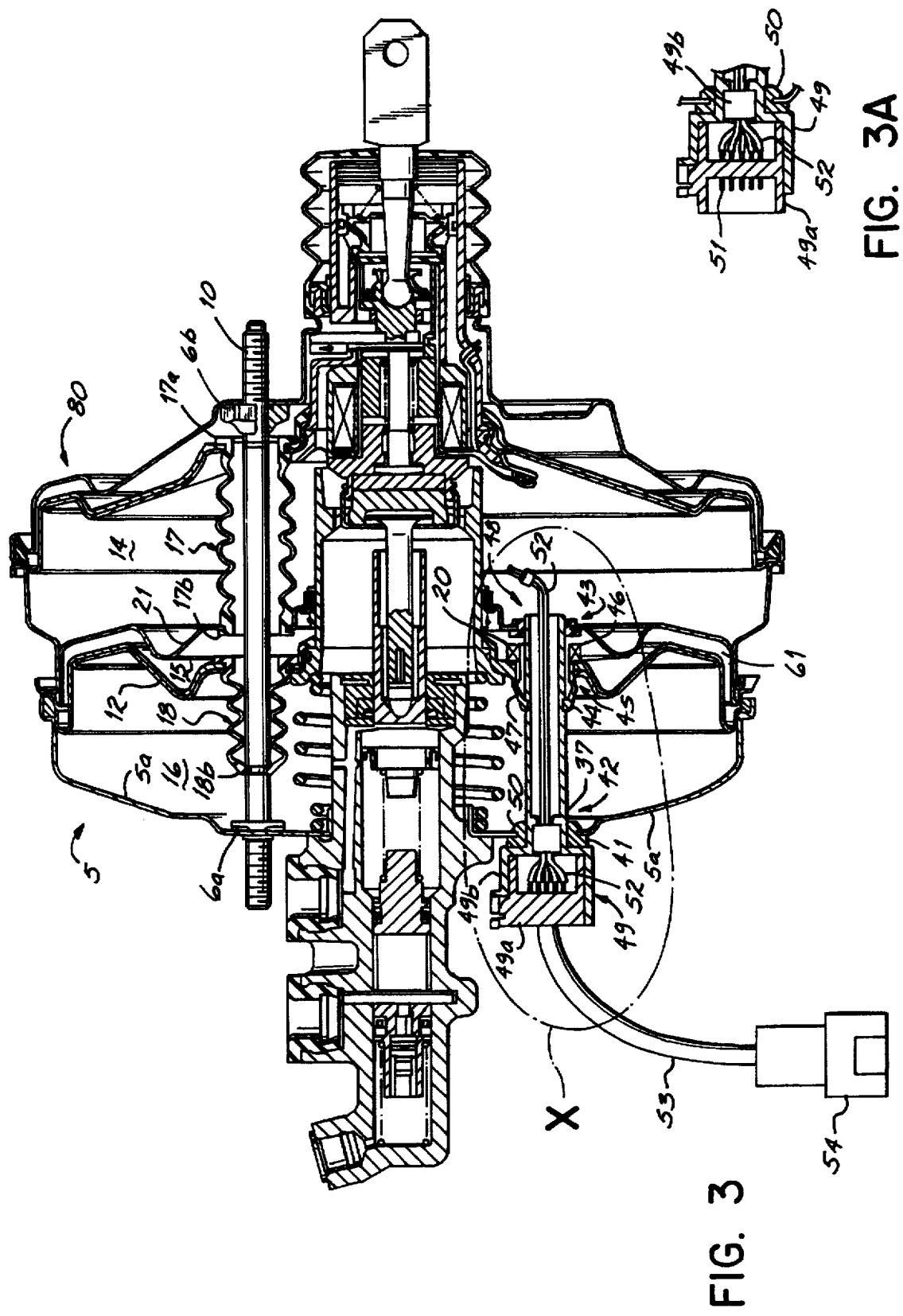
FIG. 3 shows a schematic side sectional view of a brake servo unit of a vehicle braking system.
FIG. 3a shows another embodiment of the cable carrier design shown in FIG. 3.

The tandem brake servo unit shown in FIG. 3 essentially corresponds to the embodiment shown in FIG. 1. Corresponding parts are therefore identified with the same reference numerals and their description is omitted.

In this case a travel sensor 20 arranged in the cable carrier 32 detects markings 24 which upon a movement of the movable partition 12 move relatively to the travel sensor 20, instead of the markings applied to the tie bolt 10 which are detected by a travel sensor mounted at the movable partition 11.

In the embodiment of the cable carrier shown in FIG. 3 no markings 24 are present. This means that the cable carrier 32 in the shown form which will be described in the following can also be employed without the development as a carrier for the travel sensor, i.e. solely as a hermetically sealed line or cable conduit.

The cable carrier 32 is formed by a tubular sleeve and projects with a rubber seal 41 in an opening 42 through the housing wall 5a into the working chamber 16. At its outer wall the cable carrier 32 is surrounded by a seal lip 44 of a sealing element 45 in an air tight but axially movable manner. In this case the sealing element 45 is a rubber disk extending over the entire area of the movable partition 12, the edge of which is axially movably clamped at the inner circumference of the housing 5. The seal lip 44 is formed at a tubular neck 47 integrally connected with the remaining rubber disk and which projects through an opening 46 in the movable partition 12.

The free end of the cable carrier 32 extending into the interior of the brake servo unit is secured in an opening 48 in the stationary partition 21 by means of a sealing sleeve 43. The end of the cable carrier projecting from the housing 5 of the brake servo unit has a receptacle 49, into which cables for sensors and/or actuators in the brake servo unit extend. A hermetic seal 49a and 49b ensures that the vacuum in the chamber 14 or the chamber 16, respectively, will not cooperate with the atmospheric pressure. The cable carrier 32 is mounted in an air tight manner in the housing wall 5a of the brake servo unit by means of a sealing sleeve 50.

Instead of the e.g. potted seal 49a in the receptacle 49a plug and socket arrangement can also be provided, as it is indicated in FIG. 3a. In this case, the receptacle 49 is formed by an insert which, in the longitudinal section, is essentially H-shaped and which carries plug pins 51 with lines 52 at their end facing the brake servo unit, which extend through the cable carrier 32 into the interior of the brake servo unit.

A line 53 is provided with connectors at both ends, one of which can be plugged into the receptacle 49 while the other connector 54 leads to the electronic control unit (not shown).

Details and possible designs of the travel sensor 20 and the markings 24 in the cable carrier 32 are illustrated in FIGS. 4 and 5.

The marking 24 can take the form of a metallic tubular sleeve the wall thickness of which increases over its length. The travel sensor 20 is a detector which generates a signal characteristic for the wall thickness.

The idea illustrated in FIGS. 4 and 5 to arrange the markings 24 in the interior of the cable carrier 32 can also be realized with the tie bolt 10. This means that the tie bolt is constructed as hollow rod, in the hollow space of which the marking 24 (in the form of one or a plurality of resistive, capacitive or inductive structural elements) and alternative, or in addition, the lines are arranged. Depending on the measuring principle, the hollow space may be hermetically sealed within the tie bolt. This means that a measuring principle has to be selected ensuring a scanning of the marking 24 without any mechanical contact or impact. It is however also possible to provide the tie bolt 10 with a longitudinal slot through which a scanning means may extended into the hollow space to scan the marking 24.

In a similar manner the marking 24 can take the form of a metallic tubular sleeve which at its inner surface is provided with annular bulges equally spaced over its length. The travel sensor 20 is a detector which detects these bulges and generates a corresponding signal.

In order to compensate for possibly developed tolerances the travel sensor 20 can also be guided on the cylindrical cable carrier and upon movement of the partition 12 dragged for example via a driving tongue which is only axially positively locked with the movable partition 12.

The cables 22, 23 can also extend through a radial opening into the interior of the cable carrier and from there be connected with the electronic control unit.

We claim:

1. An electronically controllable brake servo unit with a first pneumatic working chamber (13) and a second pneumatic working chamber (14) which are separated from each other by a movable wall (11), wherein a travel sensor (20) is provided for the detection of displacements of the movable wall (11) relative to a stationary wall (5b) of at least one of the two working chambers (13, 14) which converts a relative movement between a measuring element (10) and the travel sensor (20) in the direction of the movement of the movable wall (11) into a signal used for controlling the brake servo unit, and wherein the movable wall (11) is provided with an opening (19) through which the measuring element (10) projects which is securely connected with the stationary wall (5b), and the travel sensor (20) at least partially surrounds the opening (19) and the measuring element (10) projecting through it, and wherein the measuring element (10) is provided with markings (24) which are detectable by the travel sensor (20) upon movements of the movable wall (11), or that the measuring element (10) carries the travel sensor (20) and markings (24) are provided in the area of the opening (19) which can be detected by the travel sensor (20) upon movements of the movable wall (11).

2. An electronically controllable brake servo unit according to claim 1, characterized in that the measuring element (10) is formed by at least one of a tie bolt (10) which serves for securing the brake servo unit in the vehicle and a cable carrier (32) which serves to introduce lines comprising electrical cables (52), into the interior of the brake servo unit.

3. An electronically controllable brake servo unit according to claim 2, characterized in that the measuring element, at least partially comprises a hollow space (32a) into which the lines (52) for sensors or actuators of the brake servo unit are routed.

4. An electronically controllable brake servo unit according to claim 3, characterized in that the passage area of the measuring element extends through a housing wall (5a) of the brake servo unit into the working chamber (16) and is hermetically sealed.

5. An electronically controllable brake servo unit according to claim 3, characterized in that the cable carrier (32) is provided with the markings (24) detectable by the travel sensor (20) at the inner wall of the hollow space (32a).

6. An electronically controllable brake servo unit according to claim 2, characterized in that the brake servo unit is designed as a tandem brake servo unit, where the tie bolt (10) penetrates all working chambers (13, 14, 15, 16) arranged one after the other and where the two working chambers (13, 14) with a higher pressure level each are pneumatically connected to each other by means of a bellows (17) surrounding the tie bolt (10) and the travel sensor (20) is arranged at the movable wall (11) and detects the markings (24) on the tie bolt (10).

7. An electronically controllable brake servo unit according to claim 1, characterized in that the measuring element is surrounded by a sealing element (17, 18).

8. An electronically controllable brake servo unit according to claim 1, characterized in that the markings (24) are so designed that they are detectable by a capacitive, inductive, resistive, optical or magnetic field sensitive travel sensor (20).

9. An electronically controllable brake servo unit, characterized by a brake servo unit according to claim 1.

* * * * *